United States Patent
US 7,014,782 B2
D'Emidio et al.
Mar. 21, 2006

(54) POINT-OF-USE WATER TREATMENT ASSEMBLY

(75) Inventors: Joseph A. D'Emidio, 3649 Tallwood Ter., Falls Church, VA (US) 22041; Gilbert V. Levin, Annapolis, MD (US)

(73) Assignee: Joseph A. D'Emidio, Falls Church, VA (US)

( * ) Notice: Subject to any disclaimer, the term of this patent is extended or adjusted under 35 U.S.C. 154(b) by 54 days.

(21) Appl. No.: 10/690,822

(22) Filed: Oct. 23, 2003

(65) Prior Publication Data

US 2005/0087500 A1    Apr. 28, 2005

(51) Int. Cl.
*C02F 1/50* (2006.01)
(52) U.S. Cl. ............... 210/764; 210/205; 210/232; 210/501
(58) Field of Classification Search ............... 210/764, 210/198.1, 205, 232, 501
See application file for complete search history.

(56) References Cited

U.S. PATENT DOCUMENTS

| | | | | |
|---|---|---|---|---|
| 4,151,092 A | * | 4/1979 | Grimm et al. | 210/256 |
| 4,312,754 A | * | 1/1982 | LaFontaine | 210/267 |
| 4,389,311 A | * | 6/1983 | La Freniere | 210/198.1 |
| 4,505,823 A | * | 3/1985 | Klein | 210/668 |
| 4,999,109 A | * | 3/1991 | Sabre | 210/244 |
| 5,061,367 A | * | 10/1991 | Hatch et al. | 210/137 |
| 5,211,973 A | * | 5/1993 | Nohren, Jr. | 426/82 |
| 5,308,482 A | * | 5/1994 | Mead | 210/207 |
| 5,405,526 A | * | 4/1995 | Sutera | 210/124 |
| 5,511,904 A | * | 4/1996 | Van Egmond | 405/52 |
| 5,569,374 A | * | 10/1996 | Williams | 210/136 |
| 5,582,730 A | * | 12/1996 | Hugentobler | 210/474 |
| 5,846,418 A | * | 12/1998 | Thompson et al. | 210/266 |
| 6,136,189 A | * | 10/2000 | Smith et al. | 210/266 |
| 6,202,541 B1 | * | 3/2001 | Cai | 99/286 |
| 6,296,756 B1 | * | 10/2001 | Hough et al. | 205/744 |
| 6,780,316 B1 | * | 8/2004 | Haynes et al. | 210/238 |
| 6,783,713 B1 | * | 8/2004 | Tremblay et al. | 264/113 |

* cited by examiner

*Primary Examiner*—Betsey Morrison Hoey
(74) *Attorney, Agent, or Firm*—Roylance, Abrams, Berdo & Goodman, L.L.P.

(57) ABSTRACT

A point-of-use filtering and water treating kit includes a container, a plurality of membrane-type filter elements and a filter basket to support the filter elements during use. The filter elements are contained within a reclosable package that is fitted within the container during storage. At least one ladle or other drinking cup is also contained within the container to provide a complete assembly for producing potable water. In use, the package containing the filter elements is removed from the container and a single filter element is placed in the filter basket. The filter basket is nested in the top end of the container and the water to be filtered is poured through the filter element. The filtered and purified water is collected within the container. In one embodiment, the filter elements contain a purifying agent, disinfectant or antimicrobial agent impregnated within the filter element to treat the water as the water is being filtered.

20 Claims, 4 Drawing Sheets

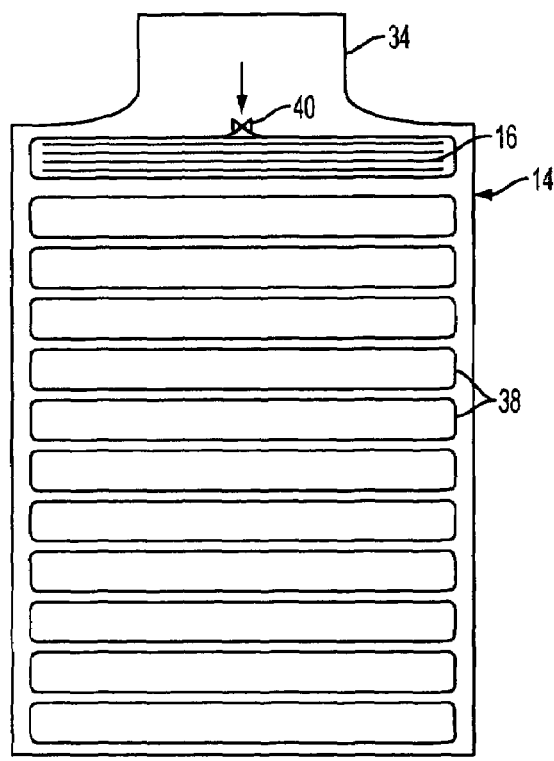
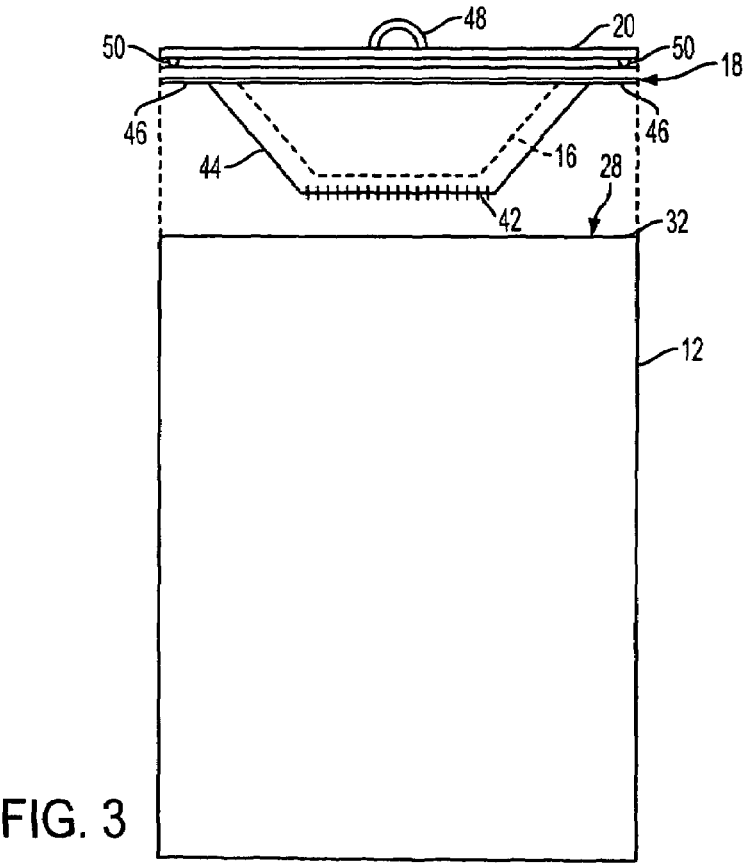

POINT-OF-USE WATER TREATMENT ASSEMBLY

FIELD OF THE INVENTION

The present invention is directed to a water treatment assembly to provide potable water. The invention is further directed to a kit providing the necessary components for providing potable water.

BACKGROUND OF THE INVENTION

There is an ongoing commitment to alleviating the desperate condition of poor, underserved people, especially in the rural areas of the developing world in providing safe drinking water. UN reports show that more than a billion people worldwide still go without it, and as a result, five million of them (many children) die from waterborne diseases every year. The World Health Organization's Water, Sanitation and Health branch wrote that an adequate supply of safe drinking water is universally recognized as a basic human need. The health consequences resulting from the inequity of poor services are sometimes considerable, as evidenced by the infant mortality rates which may vary between two and ten times in magnitude between those served with good water supplies and those which are not. The poor, in particular, are at high risk from epidemic diarrheal diseases, such as cholera.

Sanitary engineers have witnessed this devastation first-hand. It is easier in many parts of the world to find a gallon of clean gasoline than clean water. Building sustainable water treatment and delivery infrastructure for all peoples of the world is the ultimate goal. However, given the enormous costs, engineering effort and political will required, this goal may never be achieved. An interim solution is needed, and the need is dire. Throughout the third world, one can witness first hand the devastation that is wrought by the lack of clean water for the families.

SUMMARY OF THE INVENTION

The present invention is directed to a water treatment assembly and method for providing purified potable water. The invention is further directed to a self-contained kit including the necessary components to produce purified drinking water. The kit of the invention provides a rapidly deployable water treatment assembly that can be distributed to populations following disaster, such as natural disasters including floods, earthquakes, volcanic eruptions and the like.

Accordingly, a primary aspect of the invention is to provide an assembly including a container with lid. A package of filter elements is stored in the container along with a filter support and at least one suitable drinking vessel such as a ladle or drinking cup.

The invention provides rapidly deployable water treatment and disinfectant kits to large populations. The filter is for the removal of microbial contamination and can also be adapted to protect against thyroid cancer developing from exposure to radioactive iodine in the event of nuclear attack. The invention also can be used to administer dietary supplements and other medications to populations suffering such deficiencies through the drinking water by impregnating the filter elements with the dietary supplements and medications.

The water treatment kit of the invention is to provide an immediately available, easily and intuitively understood, assembled and used, unit that, in one simple operation completed within a short period of time so as not to try the user's patience, yields the essential safe water needs for one day for a family of five. The instructions are preferably pictorial on the container. The receptacle is re-usable, and the one-use filters can be safely used or disposed of in an environmentally friendly way.

The invention is a gravity-driven membrane filter with pores sized to remove particulate matter and microorganisms from the disinfectant administered to the filtered water. However, the pores are large enough to permit rapid filtration so that potable water becomes quickly available. The filter membrane is impregnated with an effective amount of the disinfectant that dissolves into the water passing through the filter, thereby providing the correct concentration of the disinfectant in the filtered water receptacle to kill microorganisms that passed through the filter. The disinfectant can be a bactericide, antibiotic or antimicrobial agent in an amount to release a concentration sufficient to kill or reduce the number of microorganisms in the water to a safe level for drinking. The filter membrane can be conical, cylindrical or flat. The filter membrane is placed into a collapsible, folding or nesting, lightweight structure of corresponding shape. The filter membrane may be made of any suitable material capable of being economically mass-produced. The filtrate receptacle is a container that serves the dual purpose of containing the entire kit for shipment, and serving as the filtrate receptacle. The material, porosity and size of the filter, the type and amount of disinfectant, and the size of the treated water receptacle provide rapid throughput of the water and sufficient disinfecting power to complete the treatment in a relatively short period of time. The entire water treatment kit is designed to meet minimum storage and weight requirements.

These and other aspects of the invention are basically attained by providing a filter assembly for producing filtered water. The filter assembly comprises a container having an open top end and a plurality of filter elements stored within the container where the filter elements are permeated with a disinfectant. A filter basket is removably coupled to a top end of the container. A lid is removably coupled to the container to form a substantially watertight seal and to close the open top end of the container.

The aspects of the invention are further attained by providing a method for producing filtered drinking water. An assembly is provided having a container with an open top end, a plurality of filter elements stored within the container, a filter basket and a lid for the container where the filter elements are impregnated with a disinfectant. The filter elements are removed from the container and the filter basket is positioned in the container and filter basket is removably coupled to the container. A filter element is positioned in the filter basket, and unfiltered water is passed through the filter element and filtered water is collected in the container.

The various aspects of the invention will become apparent from the following detailed description of the invention, which in conjunction with the annexed drawings, disclose one embodiment of the invention.

BRIEF DESCRIPTION OF THE DRAWINGS

The following is a brief description of the drawings, in which:

FIG. 2 is a cross-sectional side view of the package containing the filter members;

FIG. 3 is an exploded side elevational view of the assembly of FIG. 1;

DETAILED DESCRIPTION OF THE INVENTION

Figure 1:
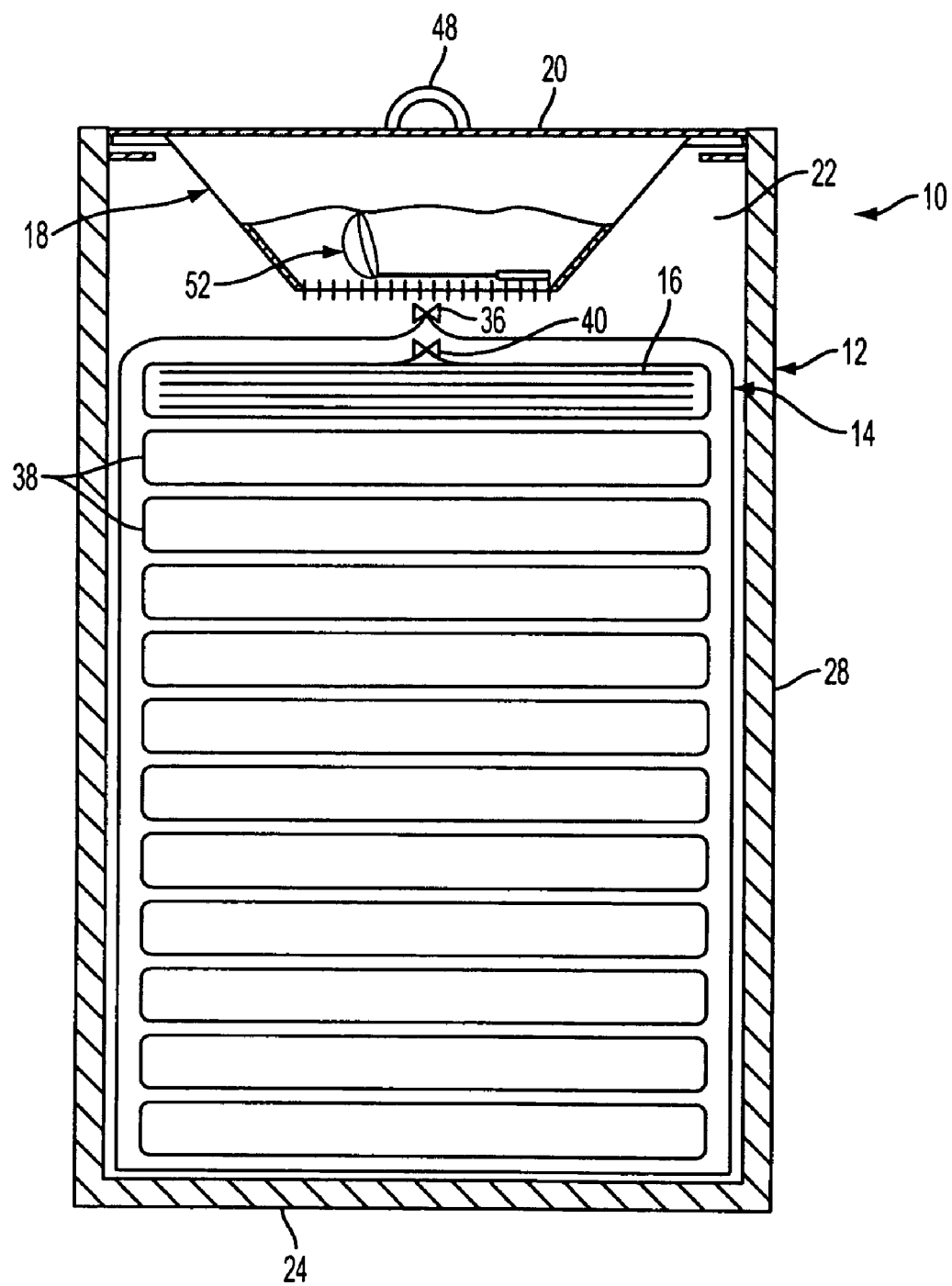
FIG. 1 is a cross-sectional side view of the assembly in one embodiment of the invention.

The present invention is directed to an assembly and method for producing filtered water. The invention is further directed to a preassembled kit containing the various components for producing filtered drinking water.

The apparatus of the invention is a self-contained assembly for producing and storing filtered water and has an indefinite shelf-life until needed in the event of emergencies or man-made and natural disasters. The filter assembly is primarily intended for producing clean drinking water and to produce clean water for washing.

Referring to the drawings, the preassembled kit of the invention is in the form of an assembly 10. Assembly 10, as shown in FIG. 1, includes a container 12, a package 14 containing a plurality of filter elements 16, a filter basket 18 and a reusable lid 20.

Container 12 has a cavity 22 defining an internal dimension that is sufficient to receive a plurality of the filter elements 16 during storage. In the embodiment illustrated, container 12 has a closed bottom wall 24, a side wall 26 and an open top end 28. In the embodiment illustrated, container 12 has a substantially cylindrical side wall 26. In alternative embodiments, container 12 can have a substantially square or rectangular shape as desired. The dimensions of container 12 can vary depending on the intended use and the desired quantity of water to be filtered and stored. In one embodiment, container 12 can have a diameter of about nine inches and a height of about 16 inches.

Figure 4:
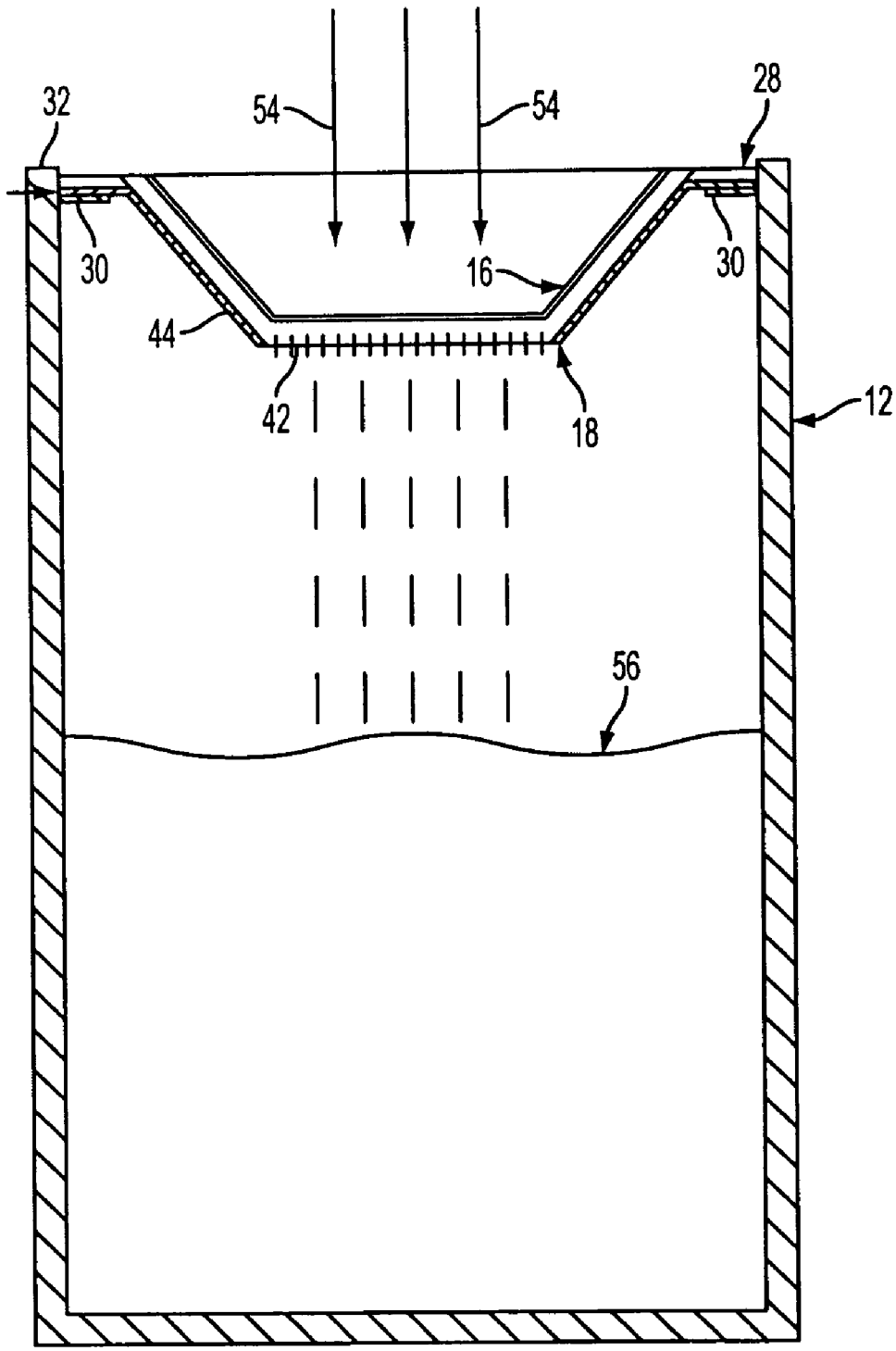
FIG. 4 is a cross-sectional side view of the container and filter assembly.

Container 12 has an open top end 28 that is dimensioned to receive filter basket 18 as shown in FIGS. 1 and 4. In one embodiment of the invention, side wall 26 of container 12 includes a lip 30 that extends radially inward. Lip 30 is positioned in the upper end of container 12 and is spaced a short distance from the top end 32 of side wall 26. Lip 30 extends inwardly a distance to support filter basket 18 in the upper end of container 12.

Container 12 is preferably made of a suitable plastic material that is lightweight, easy to clean and is reusable. In the illustrated embodiment, container 12 is a rigid structure that is able to support the filter basket 18 and to contain a quantity of filtered water. In other embodiments, container 12 can have a flexible side wall so that the volume of container 12 can be reduced when not in use. Preferably, container 12 has a dimension to contain a volume of water sufficient to supply a family of five for a day. The average daily intake of water is about 2–3 liters for an average adult.

Filter elements 16 are preferably a membrane-type filter element capable of filtering particulates from water. The pore size of the filter elements 16 is sufficient to filter particulates and microbes from the water and can filter the water by gravity without the need for high pressure pumps or other devices. Typically, filter elements 16 are a membrane-type filter as known in the art which can be made from various known filter materials. In preferred embodiments, the filter elements 16 are able to remove a sufficient quantity of particulates and microbes to produce potable water for drinking.

Filter elements 16 have a shape and dimension to complement the shape of filter basket 18. Filter elements 16 can have a substantially flat configuration that can be folded or bent to accommodate the shape of filter basket 18. Alternatively, filter elements 16 can be preformed to a shape to complement the filter basket 18.

In a preferred embodiment of the invention, filter elements 16 include a disinfectant purifying agent, antibiotic agent, antimicrobial agent, antifungal agent, algaecide, fungicide, or mixtures thereof, that are able to treat the water to destroy bacteria and microorganisms and that is able to produce filtered potable water for drinking quickly and efficiently. Preferably, the purifying agent is water-soluble or water-dispersible. In one embodiment of the invention, the purifying agent is calcium hypochlorite that is present in an amount to treat a predetermined volume of water passing through the filter elements 16. Generally, the purifying agent, such as the calcium hypochlorite, is impregnated in the filter elements 16. In other embodiments, the purifying agent can be an antimicrobial agent or antibacterial agent. One example of a suitable antibacterial agent is nalidixic acid.

In other embodiments of the invention, the filter elements 16 can include a vitamin or mineral supplement to provide a source of vitamins or minerals to humans. Typically, the vitamins or mineral supplements are water-soluble or water-dispersible. An example of a suitable water-soluble vitamin is vitamin C.

The filter elements can also be impregnated with a disinfectant, iodine or an iodine-containing compound to provide a source of iodine or a fluoride-containing compound. Iodine and iodine-containing compounds in the filter elements are desirable in areas where the food sources and water supplies are deficient in iodine to provide a mineral supplement to the population. Fluoride compounds can also be added to provide fluoridated water to help reduce dental caries.

The assembly 10 of the invention contains a plurality of the filter elements 16 that are contained in package 14. Package 14 can be any suitable packaging material that is able to maintain the filter elements in a clean and sterile condition until ready for use. Package 14 can be a rigid packaging material or a flexible and collapsible plastic bag-like material. In the embodiment illustrated, package 14 is a reclosable, waterproof plastic bag having an open top end 34 as shown in FIG. 2. Preferably, a suitable closure device, such as a wire twist tie 36, is provided to reclose package 14. In this manner, a selected number of filter elements 16 can be removed from package 14. Package 14 is reclosable to maintain unused filter elements 16 is a clean and sterile condition. In a preferred embodiment of the invention, filter elements 16 are enclosed in an inner package 38 as shown in FIGS. 1 and 2. Inner package 38 contains a plurality of filter elements 16 that can be removed for individual use. In one embodiment, inner package 38 can contain about 30 individual filter elements 16. Preferably, inner package 38 is a reclosable package so that the filter elements 16 can be removed and the inner package reclosed to maintain the clean and sterile conditions of the filter elements. In one embodiment, inner package 38 is a flexible plastic bag having an open end that can be closed by a twist tie 40 as shown in FIGS. 1 and 2. Package 14 can contain 12 or more packages 38 where each inner package 38 contains 30–40 filters. Each assembly 10 can contain about 360 to 420 filter elements.

Filter basket 18 has a shape and dimension to complement container 12 and filter element 16. As shown in FIG. 3, filter basket 18 has a porous bottom wall 42 and a side wall 44 to support the filter elements 16. Filter basket 18 can have any suitable shape that is capable of supporting the filter element and coupling to the top end of container 12. In the embodiment illustrated, side wall 44 has a substantially frustoconical shape converging toward bottom wall 42. In one embodiment of the invention, filter basket 18 has a radially extending flange 46 extending outwardly from the top end of side wall 44 as shown in FIG. 3. Flange 46 has a dimension to fit within the side wall 26 of container 12 and to complement lip 30 in container 12. Preferably, flange 46 engages lip 30 on side wall 26 of container 12 so that lip 30 supports the filter basket 18 in the upper end of container 12 during storage and during the filtering process. Typically, filter basket 18 is an integral unit made from a suitable molded plastic material so as to be reusable. As shown in FIG. 1, filter basket 18 has a dimension to nest within container 12 and sit below the top end so that filter basket 18 does not interfere with lid 20.

Lid 20 has a dimension to complement the open top end of container 12 to close container 12 and enclose the contents thereof. Typically, lid 20 has a handle 48 and a suitable flange 50 for forming a watertight seal with container 12. In the embodiment illustrated, flange 50 on lid 20 is a friction or interference fit to hermetically seal container 12. In alternative embodiments, lid 20 can include threads for mating with threads on container 12 to effectively close and seal container 12. Preferably, lid 20 is made from a plastic material and is reusable.

In one embodiment of the invention, assembly 10 which forms the water purification kit, includes a drinking vessel such as a suitable ladle 52 or drinking cup as shown in FIG. 1. Preferably, several ladles are provided for individual use. In one embodiment, five ladles 52 are provided for a family of five where each ladle 52 includes suitable indicia such as color coding to identify use by an individual. Ladle 52 preferably has a dimension to fit within filter basket 18 when not in use.

Figure 5:
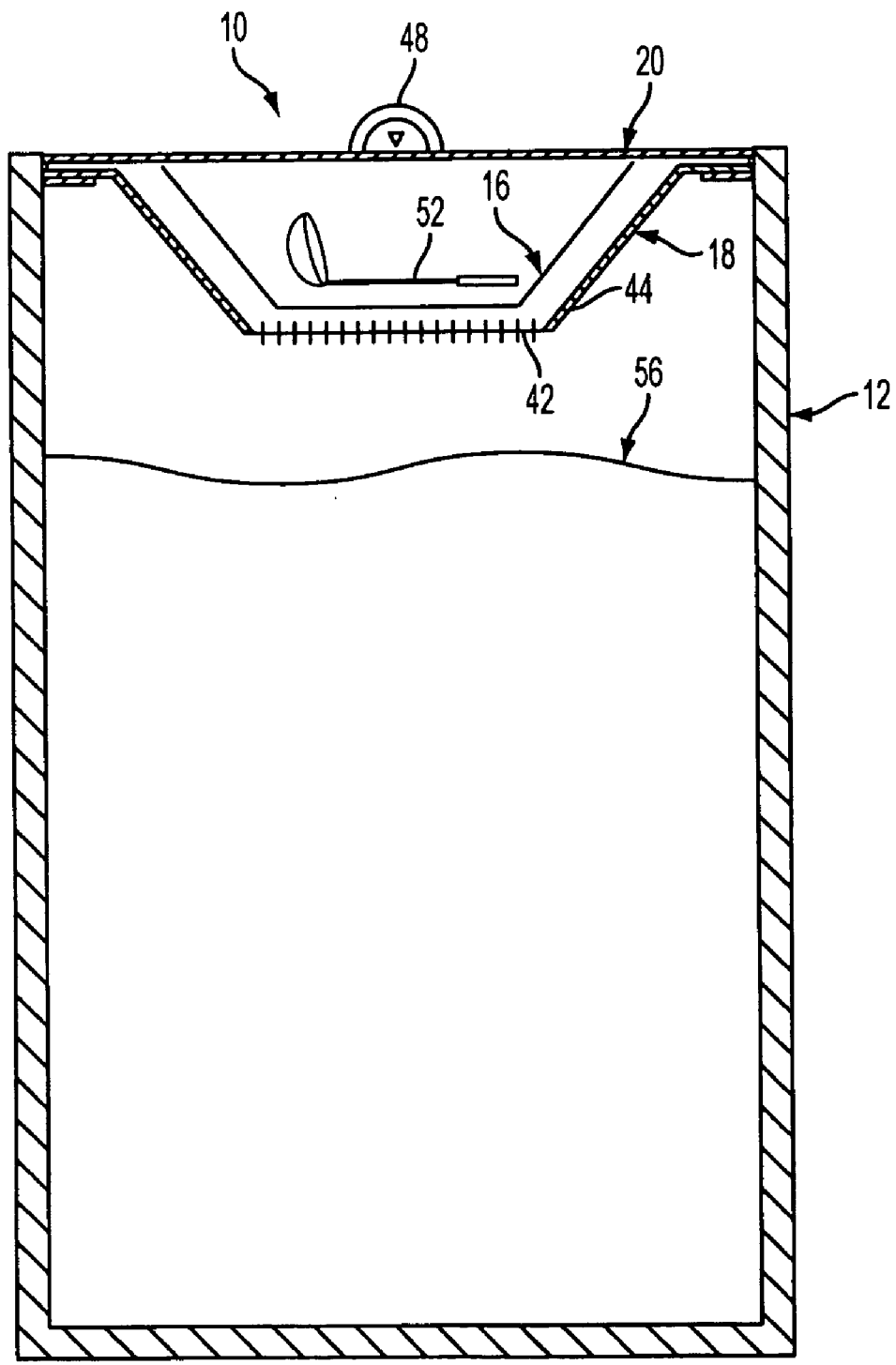
FIG. 5 is a cross-sectional side view of the container filled with water during storage.

One aspect of the invention is to provide a method for producing filtered and potable water for drinking and washing. In use, assembly 10 is transported to the site where the water is to be filtered. Package 14 is removed from container 12 and a single filter element 16 is positioned in filter basket 18 as shown in FIG. 4. Filter basket 18 is nested in container 12 with the flange 46 of filter basket 46 seated against the lip 30 on the side wall of container 12. The water to be purified is preferably decanted and then poured into the filter element 16 supported by filter basket 18 indicated by arrows 54 in FIG. 4. The water is allowed to flow through filter element 16 by gravity and is collected in container 12 as filtered and purified water 56. Preferably, the water is contained within the container for a sufficient time to allow the purifying agents to effectively treat the water. Generally, 20 minutes is sufficient for the purifying agents to effectively treat the water to a level sufficient for drinking. The drinking water 56 can be stored within container 12 as shown in FIG. 5. Ladle 52 can be placed within filter basket 18 and lid 20 coupled to container 12 to prevent contamination of the water 56.

Designed primarily to supply a daily quantity of drinking water for a family of five, the invention can be sized to supply greater quantities of treated water per kit for larger use groups, such as in schools, public meetings, refugee camps, and the like. In addition to disinfectant, the filter membrane may be impregnated with other substances. The use of filters, for example, impregnated with potassium iodine, can significantly reduce the threat of cancer induced by radioactive iodine from nuclear fallout as well as to reduce the incidence of goiter currently prevalent in iodine-deficient areas. Other healthful materials, dietary supplements or medicinal substances may be supplied in a similar manner to regions suffering from such deficiencies.

The kit includes a container, a filter basket, a lid and multiple filter membranes. Each filter membrane is impregnated with an appropriate amount of disinfectant for the quantity of water to be filtered as determined by the dimensions of the container. In this manner a single filter element is able to filter and disinfect at least the quantity of water determined by the size of the container. I other embodiments the filter elements are able to filter and disinfect several times the volume of the container. The kit also includes a simple diagram and multiple-language instructions for use. One unit of the kit contains one water receptacle and up to several hundred filters containing the disinfectant, and, where desired, other substances. All components are sterile, with the entire kit sealed in a protective wrapping, and each filter or group of filters wrapped for protection against contamination. The receptacle may be collapsible above the depth required by the stack of filters in order to provide as dense packing of the kit as possible. The invention, thus, provides highly sterile units that stack-pack to provide packages of many units that can be distributed by air, surface or water transport to areas requiring them where they can readily be unpacked and given to family units.

The only use of local materials is the requirement for a storage-settling vessel. This vessel should be the cleanest vessel of adequate size available. It should be hand washed with water obtained from one or more of the water filtration kit filters. The disinfectant in the filter will reduce the contamination. The vessel should then be filled with the raw water, by a similarly washed scoop or small vessel. The filled reservoir should then be covered with a similarly cleansed lid and be allowed to stand quiescently for about three hours to permit suspended matter to settle. When the filtration kit has been assembled, the water from the reservoir should be carefully decanted into the filter so as not to re-suspend the settled matter. Alternatively, the cleansed scoop or small vessel may be used to transfer water from the reservoir to the filter. Between filtrations, the reservoir should be kept covered. Similarly, when water is not being decanted from it, the filtered water receptacle should be kept covered with its lid.

Central to the concept is selecting materials and sources such that total costs of the water treatment kit is kept to a minimum so that the kits are sufficiently economical for government or volunteer agency distribution by the thousands or millions depending on the need. The units have a storage lifetime of many years if stored dry within a broad range of ambient conditions such as may prevail in large urban or undeveloped areas so that the kits may be positioned for immediate distribution and use either to the millions of people presently in need of them, or to those who will need them in time of attack or natural disaster.

While various embodiments of the invention have been selected to illustrate the invention, it will be understood that various modifications can be made without departing from the scope of the invention as defined in the appended claims.

What is claimed is:

1. A filter assembly for producing filtered water comprising:

a container having an open top end, a plurality of filter elements enclosed in a reclosable package and being stored within said container, wherein each of said filter elements are saturated with a water dispersible anti-microbial agent in an amount to treat the water;

a filter basket removably coupled to a top end of said container, and a lid removably coupled to said container to form a substantially watertight seal and to close said open top end of said container and said filter basket.

2. The assembly of claim 1, wherein said filter elements include a water dispersible nutrient or vitamin supplement.

3. The assembly of claim 1, wherein said filter elements are impregnated with calcium hypochlorite as said anti-microbial agent.

4. The assembly of claim 1, further comprising a plurality of drinking vessels contained within said container.

5. The assembly of claim 4, wherein each of said drinking vessels include identifying indicia.

6. The assembly of claim 4, wherein each of said drinking vessels include a different color indicia to identify use by an individual.

7. The assembly of claim 1, wherein said reclosable package is a plastic, waterproof bag.

8. The assembly of claim 1, wherein said container has an internal lip dimensioned to support said filter basket.

9. The assembly of claim 8, wherein said filter basket has a porous bottom wall, a side wall and an outwardly extending flange, said flange having a dimension to mate with said internal lip on said container.

10. A method for producing filtered and disinfected drinking water comprising the steps of:

providing an assembly having a container with an open top end, a plurality of filter elements contained in a reclosable package and being stored within said container, a filter basket and a lid for said container, wherein said filter elements are impregnated with an antimicrobial agent, removing said filter elements from said container, positioning said filter basket in a top end of said container and removably coupling said filter basket to said container, positioning a filter element in said filter basket, and passing unfiltered water through said filter element and collecting filtered and disinfected water in said container.

11. The method of claim 10, wherein said filter elements contain a said anti-microbial agent in an amount sufficient to treat a volume of water defined by a volume of said container.

12. The method of claim 10, wherein said filter elements include a water dispersible nutrient or vitamin supplement.

13. The method of claim 10, wherein said filter elements are impregnated with calcium hypochlorite as said antimicrobial agent.

14. The method of claim 10, further comprising a plurality of drinking vessels contained within said container.

15. The method of claim 10, wherein said reclosable package is a plastic, waterproof bag.

16. The method of claim 10, wherein said container has an internal lip dimensioned to support said filter basket.

17. The method of claim 16, wherein said filter basket has a porous bottom wall, a side wall and an outwardly extending flange, said flange having a dimension to mate with said internal lip on said container.

18. A filter assembly for producing filtered water comprising:

a container having an open top end and an internal lip, a filter element stored within said container, wherein said filter element is saturated with a water dispersible anti-microbial agent in an amount to treat the water;

a filter basket removably coupled to a top end of said container and having a porous bottom wall, a side wall and an outwardly extending flange, said flange having a dimension to mate with an internal lip on said container to support said filter basket, said filter basket supporting said filter element for filtering water, and a lid removably coupled to said container to form a substantially watertight seal and to close said open top end of said container and said filter basket.

19. The filter assembly of claim 18, wherein said assembly includes a plurality of filter elements enclosed within a reclosable package wherein said reclosable package is stored within said container.

20. The filter assembly of claim 18, further comprising a plurality of drinking vessels, each having an identifying color indicia, and wherein said drinking vessels are stored in said container.

* * * * *